Oct. 20, 1931.  W. E. McKIM  1,827,758
SCALE APPARATUS
Filed Sept. 14, 1928    5 Sheets-Sheet 1
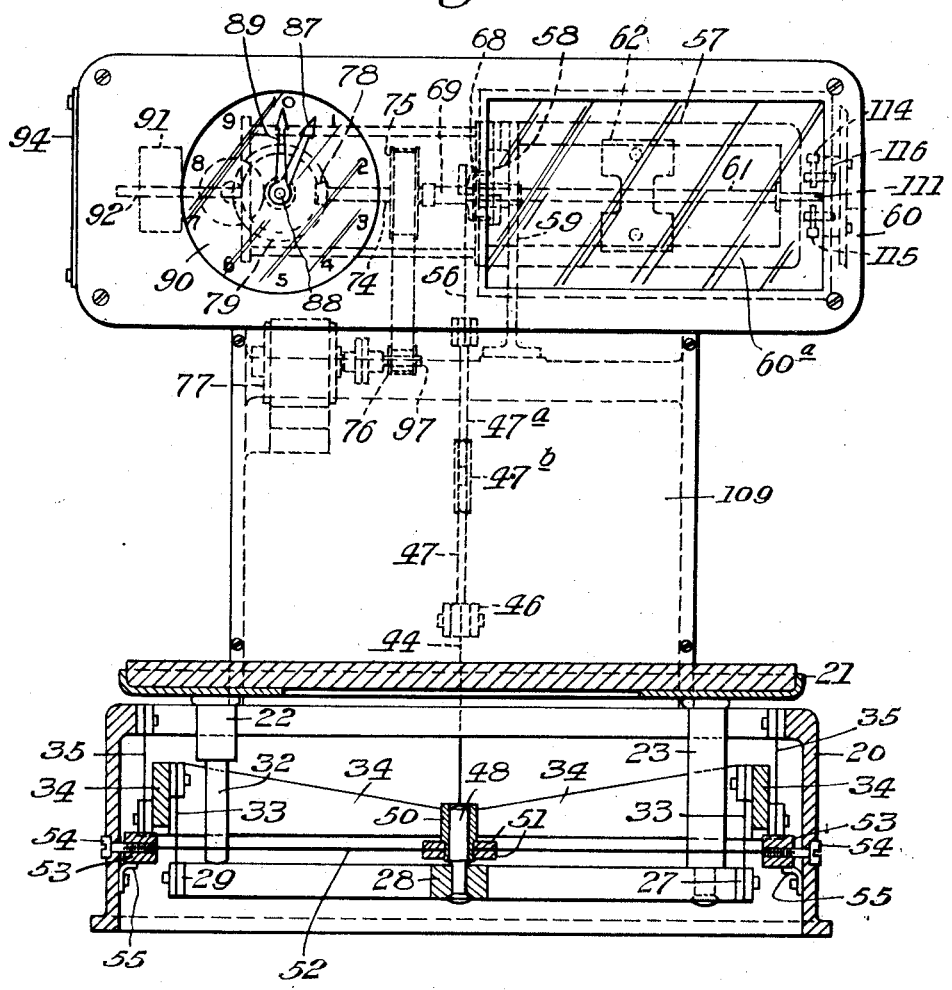
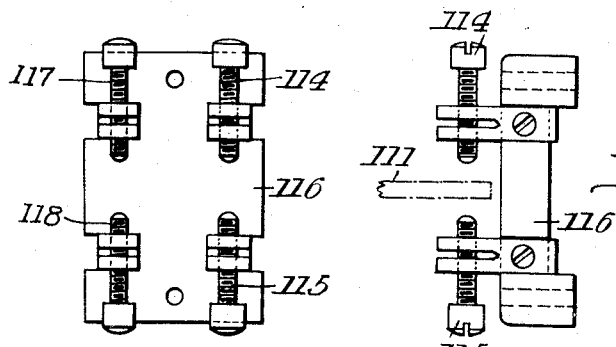
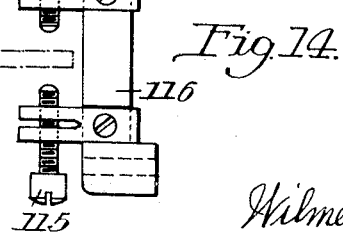
INVENTOR
Wilmer E. McKim,
By Archworth Martin
Attorney

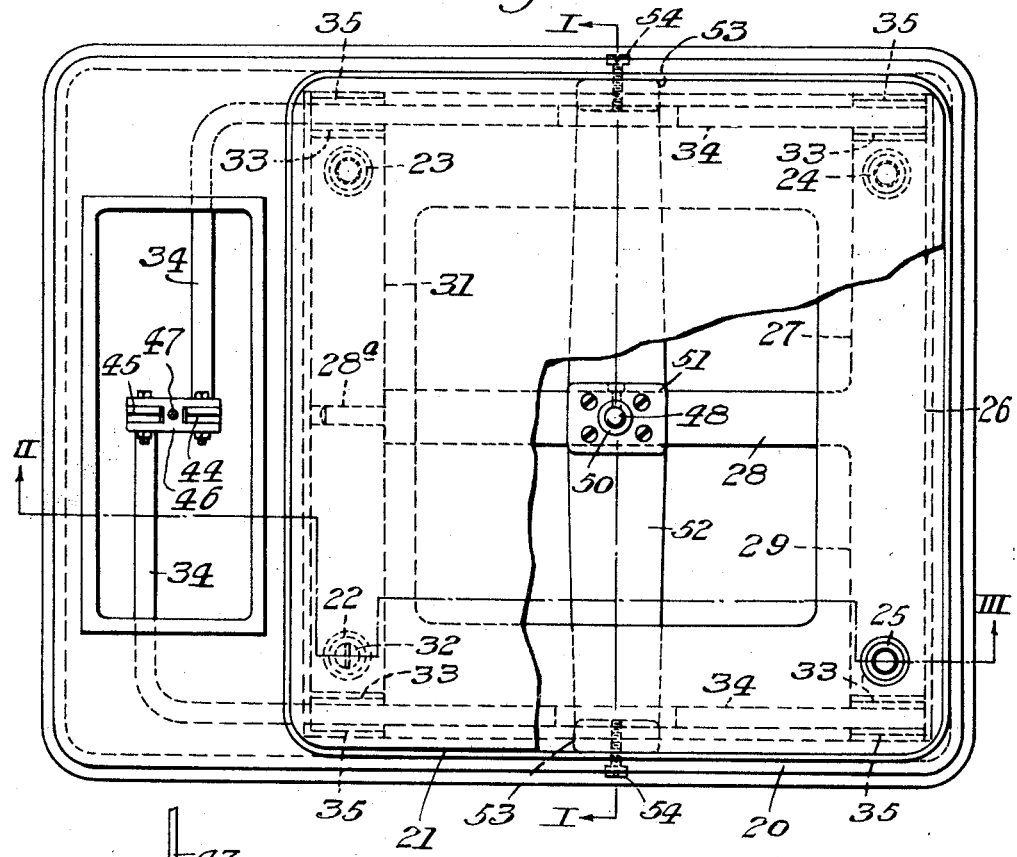
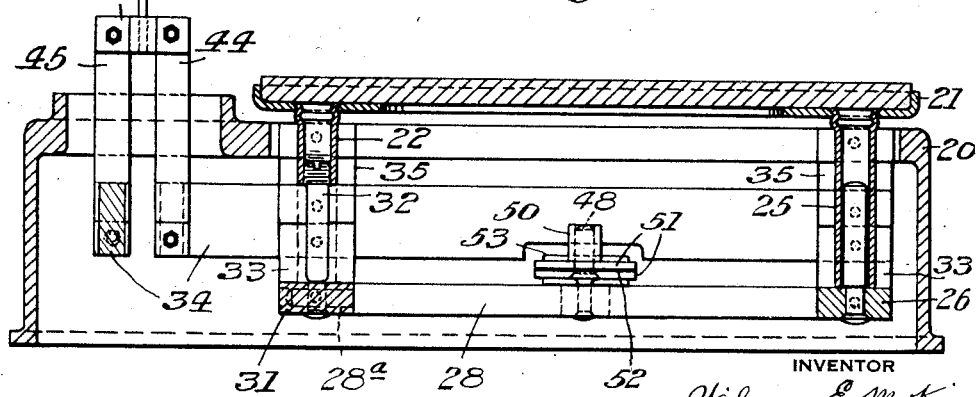

Oct. 20, 1931.  W. E. McKIM  1,827,758
SCALE APPARATUS
Filed Sept. 14, 1928   5 Sheets-Sheet 3
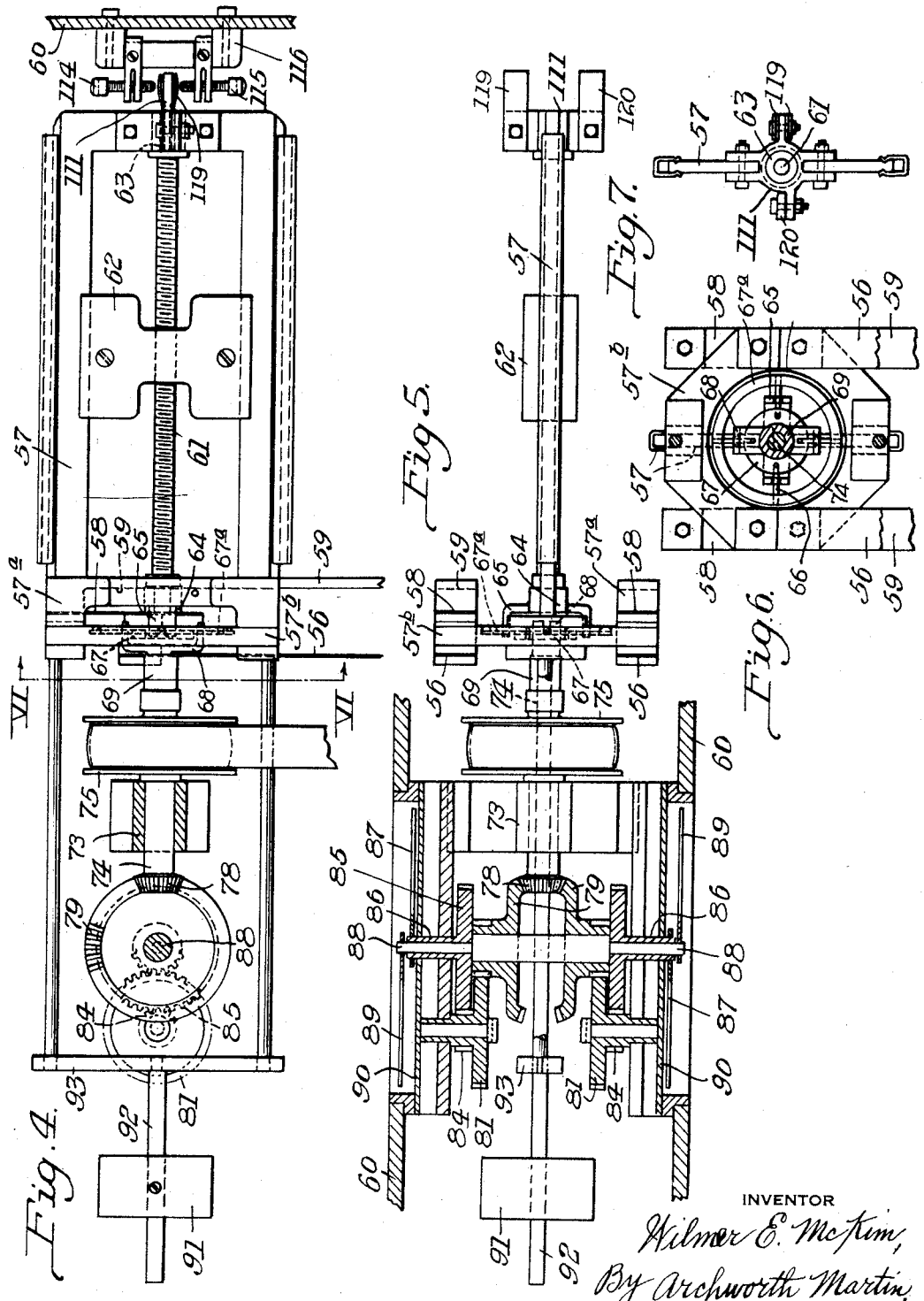

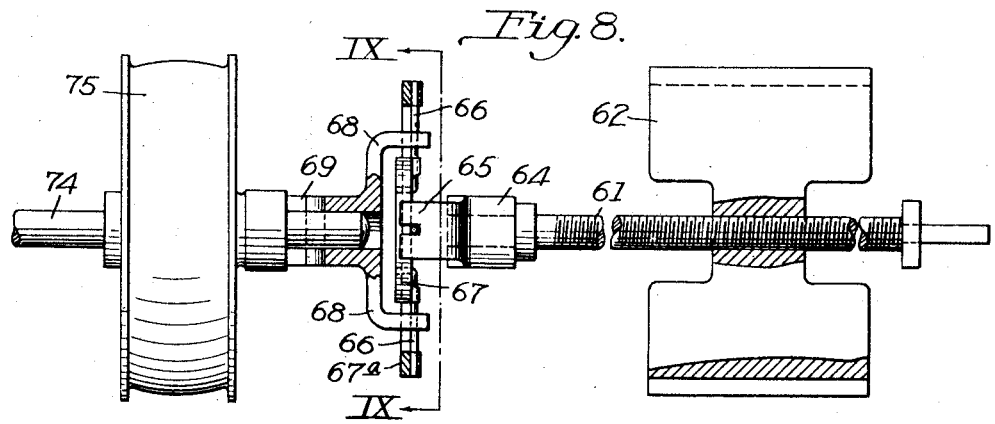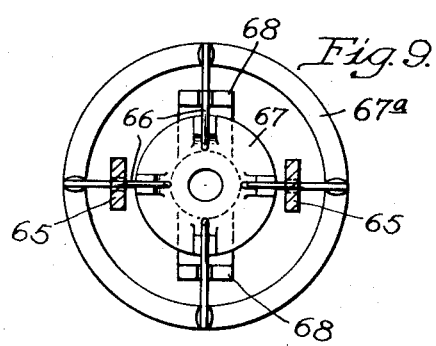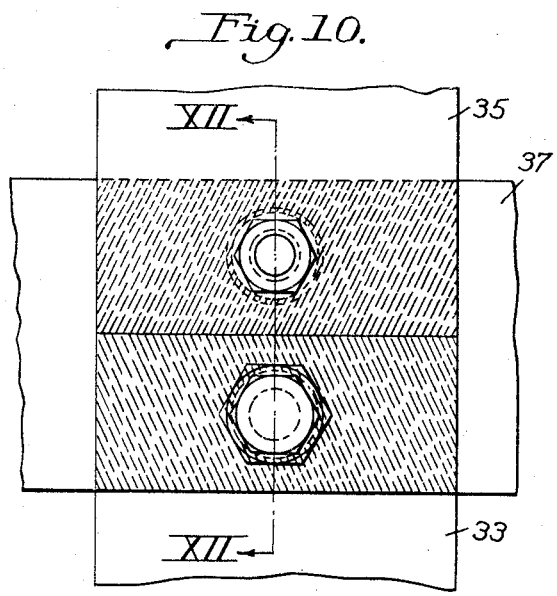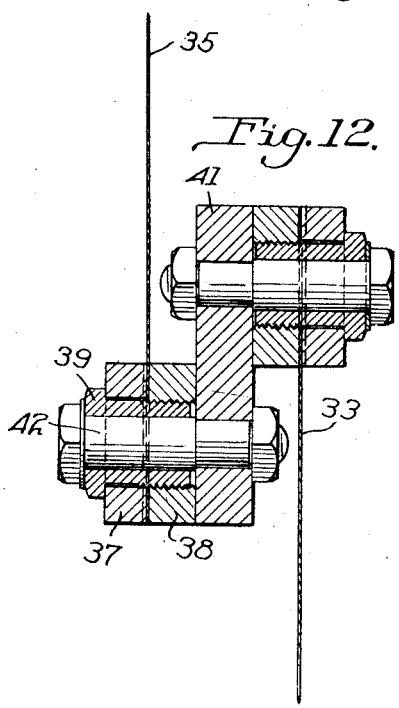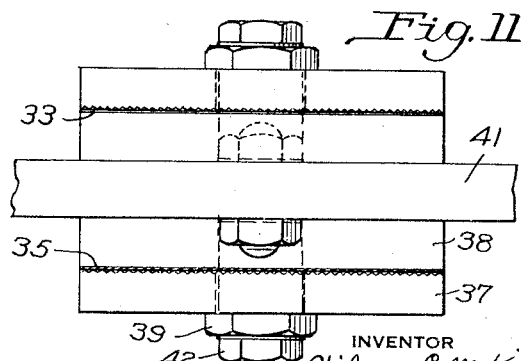

Oct. 20, 1931. W. E. McKIM 1,827,758
SCALE APPARATUS
Filed Sept. 14, 1928   5 Sheets-Sheet 5
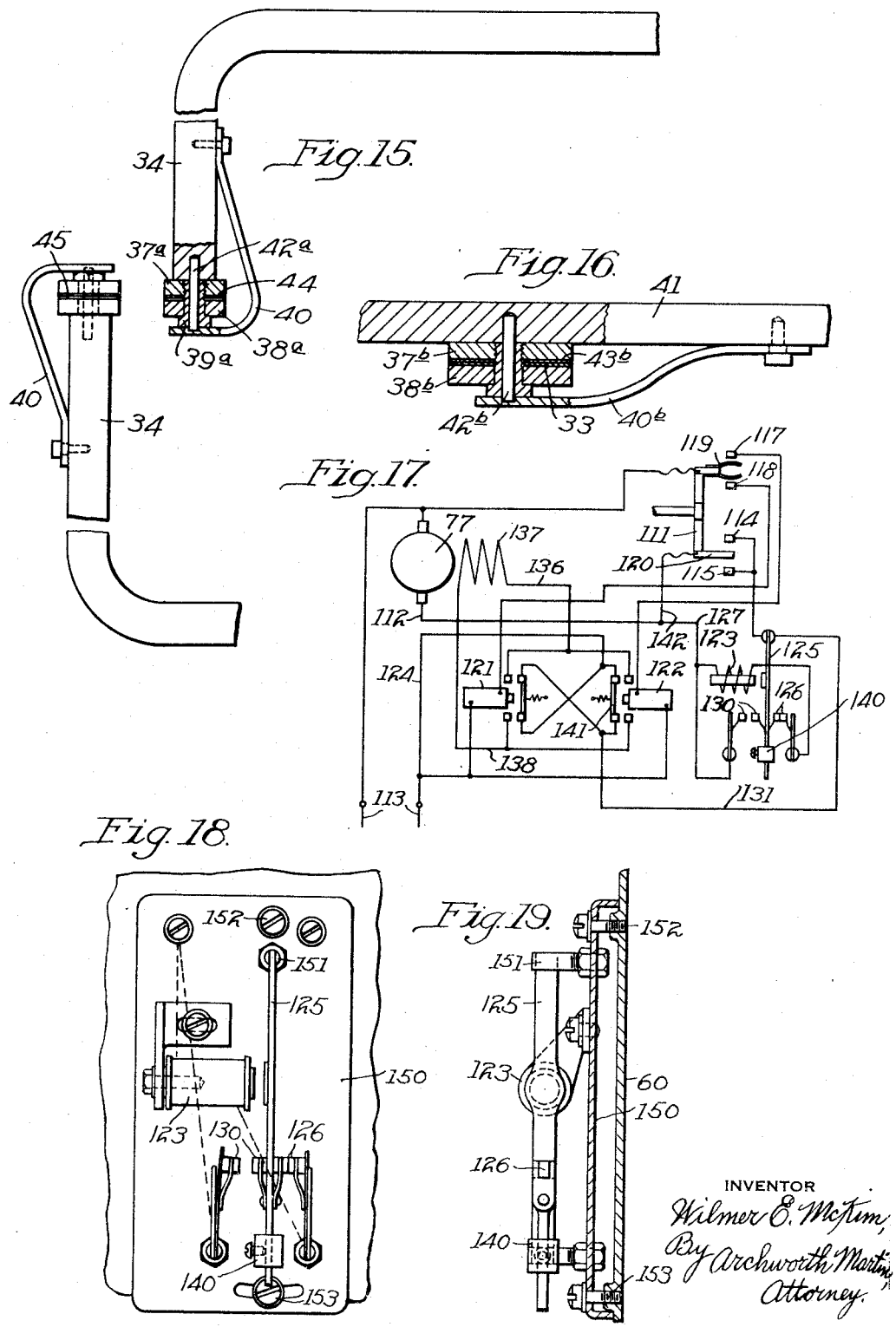

Patented Oct. 20, 1931

1,827,758

UNITED STATES PATENT OFFICE

WILMER E. McKIM, OF NEW KENSINGTON, PENNSYLVANIA, ASSIGNOR TO WALTER E. SPILL, TRUSTEE, OF PITTSBURGH, PENNSYLVANIA

SCALE APPARATUS

Application filed September 14, 1928. Serial No. 305,942.

My invention relates to weighing apparatus, such as scales, and particularly to those of the type capable of indicating weights with great exactness, as in the case of those for laboratory use, for example.

My invention has for one of its objects the provision of scale apparatus wherein there is little or no tendency for the parts to become so worn or disarranged through use as to impair the accuracy thereof.

Another object of my invention is to provide weighing apparatus wherein there are no losses through friction of the pivotally-moving parts of the scale.

A further object of my invention is to provide a scale having a poise and indicating mechanism that are automatically operable to indicate weights, and which are automatically returned to neutral or balanced positions when the weight is removed.

Another object of my invention is to provide an improved arrangement of operating mechanism for the poise and indicator of a scale.

Another object of my invention is to provide, in a scale employing flexible suspension strips, means for so connecting said strips to their associated elements that each strip will be under uniform stress throughout its entire width, and buckling or wrinkling of the strips avoided.

Another object of my invention is to provide an improved arrangement of scale-platform structures whereby tilting of the platform is avoided, as by the provision of a three-point support, and means for effecting adjustment to effect levelling of the platform.

Still another object of my invention is to simplify and improve generally the structure and operation of scale mechanisms.

This invention constitutes an improvement upon that described and claimed in my copending application, Serial No. 199,237, filed June 16, 1927.

One form which my invention may take is shown in the accompanying drawings, wherein Figure 1 is a view of the apparatus, partially in elevation and partially in section, the sectional portion of the view being taken on the line I—I of Fig. 2; Fig. 2 is a view, partially in plan and partially in section, of the apparatus of Fig. 1; Fig. 3 is a view taken on the line III—III of Fig. 2; Fig. 4 is a view, on an enlarged scale, of a portion of the apparatus of Fig. 1, with certain of the parts removed; Fig. 5 is a sectional plan view of a portion of the apparatus of Fig. 4; Fig. 6 is a view taken on the line VI—VI of Fig. 4; Fig. 7 is an elevational view of the outer end of the scale beam of Fig. 4; Fig. 8 is a longitudinal sectional view on an enlarged scale of a portion of the apparatus of Fig. 4; Fig. 9 is a view on a still further enlarged scale, taken on the line IX—IX of Fig. 8; Fig. 10 is a view on a greatly enlarged scale, showing one manner in which the flexible weight-transmitting elements may be clamped at their ends; Fig. 11 is a plan view of the structure of Fig. 10; Fig. 12 is a view taken on the line XII—XII of Fig. 10; Fig. 13 is an end elevational view of the stationary electrical contact members of Figs. 1 and 4; Fig. 14 is a side elevational view thereof; Figs. 15 and 16 show modifications of the flexible strip attaching means of Figs. 2, 10, and 12, Fig. 17 is a wiring diagram showing the manner in which the circuit of the motor of Fig. 1 is controlled; Fig. 18 is a side elevational view of certain of the relay members that are diagrammatically shown in Fig. 17, and Fig. 19 is a sectional end view thereof.

Referring to Figs. 1, 2 and 3 of the drawings, I show a scale base 20, that is in the form of a casing or housing, and a scale platform 21 that is provided with four downwardly extending columns, 22, 23, 24 and 25.

The lower end of columns 24 and 25 rest upon a bracket 26 that is provided with three extensions 27, 28 and 29. The arm 28 is provided with a pin-like extension 28a on its outer end and a bar 31 is pivotally supported on this extension. The column 23 rests upon one end of the bar 31, while the column 22 is supported thereon by a pin 32 whose upper end has screw-threaded engagement with the column 22 so that it may be adjusted to distribute the weight of the forward edge of the platform uniformly as between the ends of the bar 31 and to permit levelling of the platform with respect to the bracket 26. It will be seen that there is in effect a three point support for the platform 21, at 28a, 24 and 25, thus avoiding rocking or tilting thereof when in use.

The bracket 26 is supported at each of its four corners by a flexible strip 33 of phosphor bronze or the like. The upper ends of the flexible strips are connected to rocker arms 35 that are of Z form in cross section as shown in Fig. 1, and have their inner ends bent at right angles as shown in Fig. 2. The bars 34 are supported by flexible strips 35 whose upper ends are connected to inturned flanges of the base 20, as shown more clearly in Fig. 1. It will be seen that when weight is imposed upon the scale platform 21, it will be transmitted through the columns 22, 23, 24 and 25 to the bracket 26; thence to the strips 33, rocker arms 34 and strips 25 to the scale base and that the rocker arms 34 will be rocked about their longitudinal axes to a degree dependent upon the extent to which the flexible strips are bent by the weight imposed upon the platform.

An important feature of my invention resides in the manner of connecting the ends of the suspension strips 33 and 35 to their associated members. As shown more clearly in Figs. 10, 11 and 12, the strips 35, for example, are clamped between the blocks 37 and 38, the block 37 having its inner surface corrugated diagonally so that it will more firmly grip or clamp the strip 35 against the block 38, when the screw 39 is tightened. The blocks 37 and 38 are supported as a unit against a bar 41, by a pivot bolt 42, so that the blocks 37—38 can swivel with respect to the bar 41, under stresses imposed longitudinally of the strip 35. This provision for swivelling movement, as well as the corrugated surfaces of the block 37, insures that there will be uniform distribution of weight across the entire width of the strip 35. The corrugations can be arranged diagonally as shown, or arranged in a series of concentric circles or other form, but I prefer to make such corrugations non-parallel to either the vertical or the horizontal edges of the block, because, in the first place, there would perhaps be a tendency for the wrinkles to form longitudinally of the strip 35 when weight is applied thereto, and if the corrugations were extended horizontally, the uppermost corrugation might tend to cause cutting of the strip through repeated deflections thereof. The clamping blocks for the strip 33 are formed in the same manner as are the blocks 37 and 38.

It will be seen that the bar 41, together with the clamping blocks referred to, form a structure that is of approximately Z form (Fig. 12), so that when weight is imposed upon the lower end of the strip 33, it will tend to rock the bar 31 in a vertical plane, since the strip 33 is connected to the block at a point horizontally removed from and somewhat above the point at which the strip 35 is connected thereto, such strips will be deflected to an extent determined by the amount of weight imposed upon the strip 33, it being understood that the upper end of the strip 35 may be supported in any suitable manner as in Fig. 1, for example.

The rocking of the arms 34 through deflection of the strips 33 and 35 is transmitted to strips 44 and 45 that are connected to the inturned ends of such arms. The upper ends of these strips are connected to a block 46 that is carried at the lower end of a suspension rod 47.

In Fig. 15, I show another manner in which the suspension strips 44 and 45 may be connected to the rocker arms 34 of Figs. 2 and 3. In this form of device, the strips are clamped between blocks 37a and 38a by means of a hollow screw 39a. The inner end of the screw 39a is threaded for engagement with the block 37a and its head seats against the outer side of the block 38a, so that when it is tightened, the strip will be clamped between the blocks. The blocks 37a and 38a together with the screw 39a, are rotatably supported upon a pin 42a, which is driven into the end of a rocker arm 34. This arrangement permits of necessary swivelling movement to insure uniform tension throughout the width of the strips.

An important feature of this invention resides in the provision of means for quickly disconnecting the strips and their supporting members to permit of replacement or repairs. To this end, I provide a retaining spring or clip 40, whose one end is pivotally connected to the rocker arm 34 and whose other end is sprung into position over the outer end of the pin 42a and the screw 39a. When it is desired to disconnect the strips from the rocker arm, the free end of the spring 40 is pulled outward to clear the pin 42a and can then be swung about its pivot, thus permitting the clamping blocks 37a and 38a and the screw 39a to be slid from the pin 42a.

Fig. 16 shows a modification of the structure of Figs. 10 to 12, the suspension strip 33 being shown as connected to the bar 41 in substantially the same manner as the strips 44 and 45 of Fig. 15 are connected to the rocker arms. In this case, the spring 40b is shown as having its one end pivotally connected to the bar 41 and its other end as yieldably holding the clamping blocks and the strips in position upon the stud 42b that is driven into the bar 41. Instead of having the clamping blocks 37b and 38b corrugated on their strip-engaging surfaces as in Fig. 12, I insert a fiber sheet 43b between the block 38b and the block 37b, which affords a yieldable surface that will distribute the clamping force across the entire width of the strip, and tend to maintain it under uniform tension throughout its width. In this structure, as in Figs. 10 to 12, the strip has pivotal movement with respect to the block 41.

In order to prevent side sway of the platform 21, I provide an upwardly-extending stud 48 having a shouldered portion seated upon the arm 28 of the bracket 26 and whose lower end is riveted over to hold the stud in place. A collar 50 is supported by the stud 48, and clamping nuts 51 have screw-threaded engagement with said collar. The nuts 51 serve to clamp a flexible strip 52 and connect it to the arm 28. The ends of the strip 52 are secured to blocks 53 that have threaded engagement with adjusting screws 54 which extend through the walls of the base 20, so that the strip 52 may be maintained under tension. The blocks 53 are prevented from turning when the screws are being adjusted by means of stop members 55. It will be seen that while the strip 52 will flex or give when weight is imposed upon the scale platform, through downward movement of the bracket 26, it will prevent objectionable side sway of the bracket and the scale platform, by reason of the connections at its ends to the scale base which is rigid.

The rod 47 (Fig. 1) is connected to another rod section 47a by a turn buckle 47b, for the purpose of effecting adjustments. The upper end of the rod section 47a is connected through proper clamping plates to flexible strips 56 that are in turn connected to a spider 57b (Fig. 6). A pair of strips 58 have their lower ends connected to the spider 57b, and are connected at their upper ends to posts 59, that are secured interiorly of a casing 60 (Fig. 1). The scale beam 57 (Figs. 4, 5 and 6) is provided with a head portion 57a, that carries the spider 57b which is centrally-apertured to serve as a bearing for a screw-threaded shaft 61 (Figs. 4 and 8) that is employed for moving a poise 62, the outer end of the threaded shaft 61 being journaled in the outer end of the beam 57 at 63. Glass cover plates 60a in the sides of the casing permit viewing of the scale beam and associated parts.

A bearing 64 is provided for the inner end of the shaft 61, this bearing being supported by the spider 57b. The inner end of the shaft 61 is of yoke form having the outer ends of its legs 65 slotted (Figs. 5, 8 and 9), for driving engagement with two flexible arms 66 of an intermediate transmission member 67 which is of disc-like form and to which the arms 66, which may be of music wire, are soldered or otherwise secured. The outer ends of the arms 66 are soldered or otherwise suitably secured to a ring 67a, which prevents excessive twisting or bending of the wires 66 through the transmission of driving forces.

The ring 67a, the disc 67, and the wires 66 serve as a flexible coupling device for transmitting power to the yoke 65 and the screw shaft 61, from a yoke 68 whose ends are slotted for the reception of two of the wires 66. The yoke 68 constitutes an extension of a sleeve 69 that is rigidly mounted on a shaft 74 that is supported in a fixed bearing 73 (Fig. 4) and carries a pulley 75. The pulley 75 is driven from a pulley 76 (Fig. 1) that has connection with the shaft of a motor 77.

It will be seen that, by reason of the flexible driving connection involving the disc 67, the beam may tilt freely upon imposition of weight upon the scale platform 21 or movement by the poise 62, without interference by the driving connections for the screw shaft which advances the poise. The disc 67 floats in its position between the yokes 65 and 68, but will not fall out of operative position, by reason of the oppositely arranged slots, and the circumferential spacing of the wires 66 that are supported therein.

The shaft 74 carries a bevel pinion 78 that meshes with gear wheels 79. Each gear wheel 79 has a toothed hub that serves as a pinion for driving a gear wheel 81. Each gear wheel 81 has a hub which carries at its outer end a pinion 84 that meshes with a gear wheel 85. The gear wheel 85 has a hollow hub-like extension 86 to the outer end of which is secured an indicator hand 87. The gear wheel 85 turns loosely on a shaft 88 that has rigid connection with the gear wheels 79 and which carries an indicator hand 89 at each end, cooperating with dials 90 that contain a scale of readings for indicating weights. The gear ratio as between gear wheels 79 and gear wheels 85 is such that the indicator hands 89 will complete perhaps ten revolutions to each revolution of the hands 87.

A counter-poise 91 is carried by a rod 92 which extends rearwardly from a bracket arm 93 that is connected to the rear end of the scale beam 57. Access to the counter poise, for adjustment thereof, is had through an opening in the casing which has a cover plate 94. The motor 77 (Fig. 1), has a shaft 97 which carries the pulley 76 that drives the pulley 75, which in turn has connection with the screw shaft 61 for moving the poise 62 and the shaft 74 that drives the indicator hands. Removable plates 109 permit of access to the motor and transmission mechanism within the casing.

The scale beam carries an insulating block 111 (Figs. 1 and 7) which supports contact members 119 and 120. The contact member 120 has electrical connections (Fig. 17) through a conductor 112, with one terminal of the motor. The other terminal of the motor 77 is connected to one side of the line 113. The contact members 119 and 120 are adapted to engage stationary contacts 117 and 118, 114 and 115, respectively, (Figs. 13 and 17). The spring contacts 119 are arranged to make contact with members 117 or 118 before the contact 120, engages its contacts 114 or 115, for the purpose hereinafter described. The stationary contacts 114, 115, 117 and 118 are mounted upon an insulating block 116 (Figs. 13 and 14) that is secured to the casing 60. The block 111, and the movable contact members 119 and 120, in co-operation with the stationary contact members, serve as switches of a control circuit, for controlling the direction of the movement of the motor 77 and hence of the poise.

Referring to the wiring diagram (Fig. 17) reversing relays 121 and 122 are provided and are operated by the contact member 119 which is connected to one side of the line 113. A vibrating relay 123 is provided to cause an intermittent, or step-by-step movement of the motor, to effect a positive accurate setting of the poise.

It will be seen that when the scale beam is tipped upwardly through imposition of a relatively slight weight upon the scale platform, the contact 119 will engage the contact 117, closing the circuit through the winding of the relay 122. The relay 122 operates a switch 141 to complete a circuit which extends from one side of the supply line 113, conductor 124, the switch 141, conductor 136, field 137, conductor 138, other side of switch 141, and conductor 131, to the armature 125 of the vibrating relay 123. The circuit continues through the normally closed contacts 126 and through the winding of the vibrating relay 123, conductor 127, conductor 112 and through the armature of the motor 77 to the other side of the line 113.

The motor 77 operates in such a direction that the poise 62 is moved toward the outer end of the beam to counterbalance the weight.

The magnet of the vibrating relay operates to attract its weighted armature, closing the normally open contacts 130, and opening the above-traced energizing circuit of this relay at the contacts 126. The inertia of the weighted armature causes the contacts 130 to remain closed for a short period of time before retracting to its normal position. The closing of the contacts 130 momentarily completes the above-traced circuit, including contacts 130, to send another impulse of current through the motor 77.

By the retraction of the weighted armature 125 the circuit for the magnet of the vibrating relay 123 is again completed. The relay 123 operates as described, sending impulses of current through the motor 77 which causes the poise 62 to advance toward the outer end of the beam in a step-by-step movement. When the weight has been counterbalanced, the beam 57 tilts down, opening the circuit of the relay 122, which deenergizes, opening the circuit of the vibrating relay 123 and of the motor 77, thus causing the parts to come to rest. Thus, it will be seen that for relatively slight weights placed upon the scale platform, a positive and accurate indication will be given without a tendency of the scale beam vibrating with respect to the stationary contacts, or of having the counterpoise run past its positions of balance.

When the weight is removed from the platform, the weight of the poise 62 will cause the beam to move down, and the spring contact 119 will engage the contact 118, closing the circuit through the winding of the relay 121. The energization of the relay 121 causes the same operations as before described, except the motor will be actuated in the reverse direction, to retract the poise to a balanced position. The parts come to rest until a load has been again imposed upon the scale platform, whereupon the cycle of operations above described may be repeated.

When much heavier loads are placed upon the scale platform, the scale beam is tipped upwardly and the spring contact 119 will engage the stationary contact 117, as before described, and also, the contact 120 will engage the contact 114. By the closing of the contacts 119 and 117, there is a circuit completed for energizing the relay 122, as before described. However, as a result of the closing of the contacts 120 and 114, there is a circuit completed extending from one side of the supply line 113, through the armature of the motor 77, conductor 112, conductor 142, contacts 120 and 114, conductor 131, contacts of the switch 141, conductor 138, field 137, conductor 136, the other side of the switch 141, conductor 124 to the other side of the line 113. The relay 123 will be held in its de-energized position, as it is short-circuited by the above traced circuit, causing the motor 77 to operate continuously to advance the poise 62 to a balanced position. As the poise 62 is nearing a balanced position, the upward pressure of the scale beam is decreased until the contacts 120 and 114 open, but the contacts 119 and 117 remain closed, as the balanced position has not been reached.

As a result of opening of these contacts 120 and 114, the short circuit of the vibrating relay 123 is removed. The operation of the control circuit is now the same as before described, until the position of balance has been reached, when the parts will come to rest.

Upon removing the load from the scale platform, the weight of the poise 62 will be sufficient to cause the contacts 120 and 115, as also the contacts 119 and 118, to close. The operation in this case is the same as hereinbefore described, except the motor 77 operates in the reverse direction to effect a "no load" balance of the parts, whereupon the cycle of operations may be repeated.

Thus it will be seen that I have provided means whereby positive accurate load indications are made, without vibration or overrunning of the counter-poise.

While the reversing switch mechanism could be operated directly by the scale beam, I prefer to actuate said mechanism by means of a control circuit including the solenoids, since the contact member 111 has relatively slow movement, and there would be tendency to arcing and pitting of it and its associated contact members, which tendency is avoided by reason of the comparatively small amount of current flowing through the control circuit, because of the resistance of the solenoids.

In order that the poise may advance a considerable distance upon each revolution of the screw shaft 61, I provide a thread of wide pitch. Since such wide pitch would ordinarily result in small amount of driving surface as between the thread on the shaft and the thread of the poise, I form what is termed a triple thread, that is, one wherein each pitch dimension contains, in effect, three threads.

Referring now to Figs. 18 and 19, I show details of a relay device that may be suitably employed for controlling the circuit through the field of the motor 77, upon closing of the controlling circuit through movement of the scale beam.

The switch member 125 serves as an armature that is attracted upon energization of the coil 123 and carries the contact members 126 and 130 that are adapted to engage co-operating stationary contact members, suitably secured to the base plate 150. The contacts may be made of any suitable material, such as carbon. Upon energization of the coil 123 as heretofore explained, the member 125 is swung about its pivot 151 to close the circuit through the contact members 130, and to maintain such circuit closed when the magnet 123 is energized.

The switch member 125 is preferably made of spring material, such as a leaf spring, and its tension normally holds the contacts 126 in closed position. A weight 140 is secured to the lower end of the switch member 125, so that when the coil 123 is energized and the contacts 130 have been closed, sufficient inertia is provided to maintain the contacts 130 closed for a short period of time. The weight 140 is adjustable vertically of the switch member to permit adjustment so that it will provide the desired degree of inertia.

The base plate 150 is pivotally secured to the side wall 60 as by the pivot screw 152, and adjustably secured at its lower end by the screw 153. It will be seen that the leaf spring 125 and the weight 140 may be adjusted to change the center of gravity of the weight 140 to thereby vary the effective pull of the solenoid 123 on the switch arm 125. Thus if the plate 150 is swung in a clockwise direction, the switch arm 10 will tend to be held away from the solenoid by the weight 140 and require more force and hence a longer period of time to effect movement of the switch arm to close the contacts 30.

I claim as my invention:—

1. Scale apparatus comprising a supporting member mounted for rocking movement, a flexible suspension strip connected at its upper end to said member, and a weight-transmitting member connected to the lower end of said strip, one of said connections being pivotal, with its axis perpendicular to the plane of the strip.

2. The combination with a supporting member and a weight-transmitting member, of a substantially flat strip of flexible material connected at each end to one of said members, each of said connections being pivotal, with its axis perpendicular to the plane of the strip.

3. Scale apparatus comprising a flat suspension strip of flexible material, clamping blocks disposed against opposite faces of the strip adjacent to one end thereof, means for pivotally connecting said blocks to a weight-transmitting member, means for connecting the other end of said strip to a second weight-transmitting member, and a yieldable member interposed between one of the blocks and the adjacent clamping surface of said strip.

4. Scale apparatus comprising a supporting structure having a bar pivotally connected thereto, and a scale platform having two downwardly extending projections engaging with said structure and two projections engaging with said bar at points to either side of said pivotal connection.

5. Scale apparatus comprising a supporting structure having a bar pivotally connected thereto, and a scale platform having two downwardly extending projections engaging with said structure and two projections engaging with said bar at points to either side of said pivotal connection, one of the last-named projections being vertically adjustable with respect to its point of support on said bar.

6. Scale apparatus comprising a weight-transmitting support, a scale platform flexibly suspended from said support, a yieldable strip connected to said platform and an anchorage point, for permitting vertical movement of the platform, but restraining the same against horizontal movement, and a tensioning device for said strip.

7. Scale apparatus comprising a beam, a driven shaft rotatably mounted on the beam, a poise moved by said shaft, a driving shaft, and a coupling member including wires of spring metal for transmitting power from the driving shaft to the driven shaft.

8. Scale apparatus comprising a beam, a driven shaft rotatably mounted in the beam, a poise moved by said shaft, a driving shaft normally in axial alinement with the first-named shaft, a motor connected to the driving shaft, and a coupling member interposed between said shafts and having lost motion connection therewith in axial directions, the said coupling member having yieldable driving connection with one of said shafts and driving connection also with the other shaft.

9. Scale apparatus comprising a beam, a driven shaft rotatably mounted in the beam, a poise moved by said shaft, a driving shaft, and a coupling member interposed between said shafts and having lost motion connection therewith in axial directions, the said coupling member having yieldable driving connections with both of said shafts.

10. Scale apparatus comprising a poise device, weight-transmitting means connected to said device, a motor for moving the poise device into position to counter-balance transmitted weight, a control circuit, means for making and breaking the control circuit through movement of the weight-transmitting means, a reversing switch member for controlling the motor circuit, means for yieldably holding the reversing switch in one position, and means energized upon closure of the control circuit for moving the said switch to another position, the said switch member being weighted to prevent chattering thereof through fluctuations of current in the control circuit.

11. Scale apparatus comprising a poise device, weight-transmitting means connected to said device, a motor for moving the poise device into position to counter-balance transmitted weight, a control circuit, means for making and breaking the control circuit through movement of the weight-transmitting means, a reversing switch member for controlling the motor circuit, means for yieldably holding the reversing switch in open position, and means energized upon closure of the control circuit for moving the said switch to closed position, the said switch member being weighted to prevent chattering thereof through fluctuations of current in the control circuit.

12. Scale apparatus comprising a poise device, weight-transmitting means connected to said device, a motor for moving the poise device into position to counter-balance transmitted weight, a control circuit, means for making and breaking the control circuit through movement of the weight-transmitting means, a reversing switch member for controlling the motor circuit, means for yieldably holding the reversing switch in one position, and means energized upon closure of the control circuit for moving the said switch to another position, the said switch member being pivotally mounted at one end and weighted at its outer end to prevent chattering thereof through fluctuations of current in the control circuit.

13. The combination with a control circuit, and a main circuit, of a movable switch member for making and breaking the main circuit, means for yieldably holding the switch in open position, and a magnet in the control circuit for moving the switch to closed position, the switch being weighted to provide sufficient inertia for preventing chattering through fluctuations of current in the control circuit.

14. Scale apparatus comprising a poise device, weight-transmitting means connected to said device, a motor for continuously moving the device toward position to counter-balance transmitted weight, and means controlled by movement of the said device before reaching balanced position for effecting step by step movement of the motor to bring the device to fully balanced position.

15. Scale apparatus comprising a poise device, weight-transmitting means connected to said device, a motor for moving the device into position to counter-balance transmitted weight, and means controlled by movement of the said device to first effect continuous movement of the motor until the poise reaches a position where a major portion of the weight is counter-balanced, and subsequently to effect intermittent movement thereof when advancing the said device to its fully balanced position.

16. Scale apparatus comprising a poise device, weight-transmitting means connected to said device, an electric motor for moving the poise device into position to counter-balance transmitted weight, and a vibrating relay for making and breaking of the circuit through the motor to effect intermittent movement of the poise device to balanced position.

17. Scale apparatus comprising a poise device, weight-transmitting means connected to said device, an electric motor for moving the poise device into position to counter-balance transmitted weight, and an adjustable vibrating relay for making and breaking of the circuit through the motor to effect intermittent movement of the poise device to balanced position.

18. Scale apparatus comprising a poise device, weight-transmitted means connected to said device, an electric motor for moving the poise device into position to counter-balance transmitted weight, and a vibrating relay for making and breaking of the circuit through the motor to effect intermittent movement of the poise device to balanced position, the circuit through the relay being controlled through movement of the poise device to unbalanced position.

19. Scale apparatus comprising a poise device, weight-transmitted means connected to said device, an electric motor for moving the poise device into position to counter-balance transmitted weight, a vibrating relay for making and breaking of the circuit through the motor to effect intermittent movement of the poise device to balanced position, the circuit through the relay being controlled through movement of the poise device to unbalanced position, and means for closing the circuit through the motor independently of the relay circuit upon movement of the poise device to an unbalanced position beyond that at which the circuit through the vibrating relay is closed.

In testimony whereof I, the said WILMER E. McKIM, have hereunto set my hand.

WILMER E. McKIM.